(No Model.)
W. H. WRIGHT.
CAR AXLE PACKING.
No. 296,098. Patented Apr. 1, 1884.
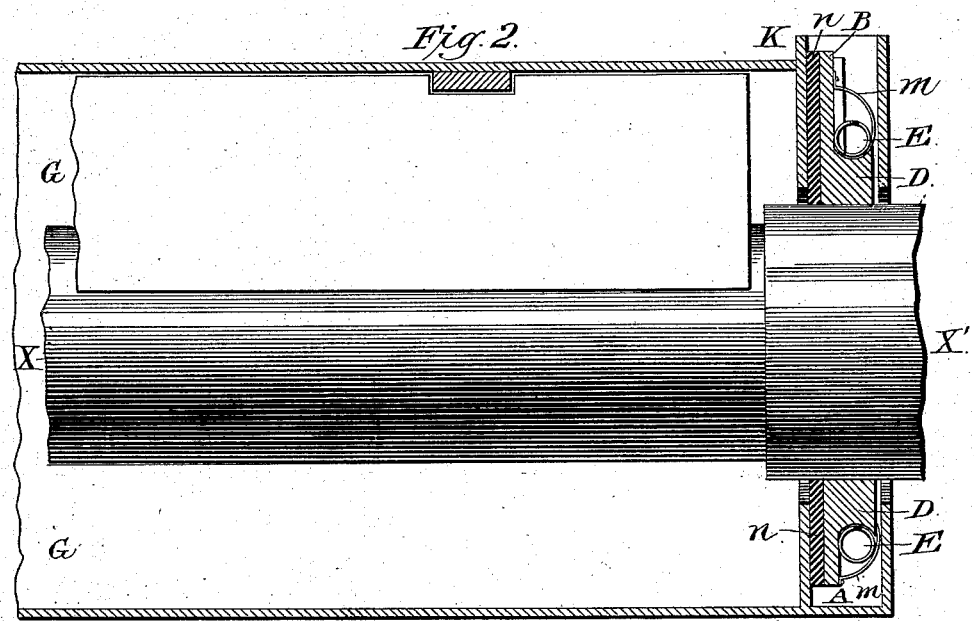
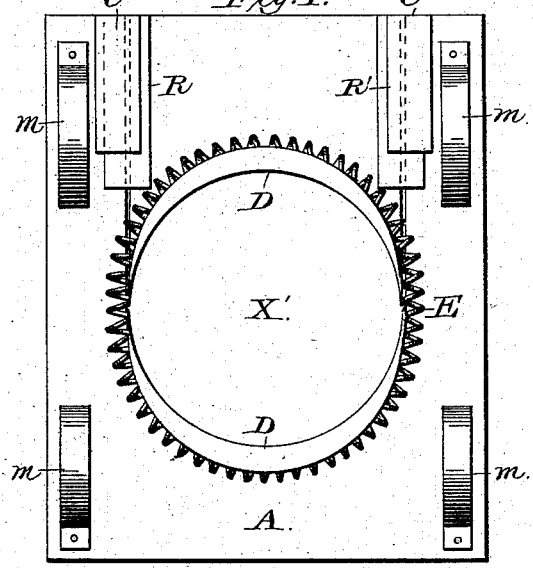
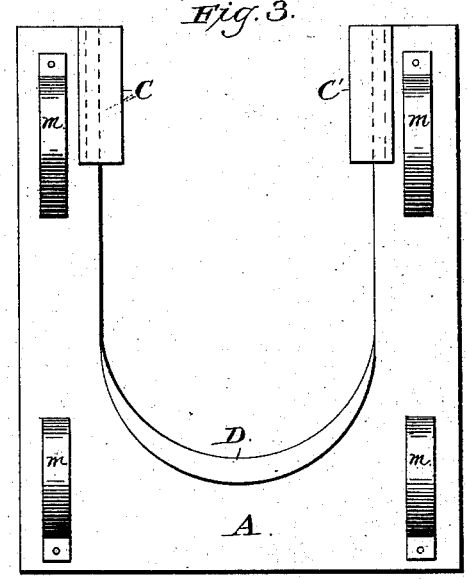
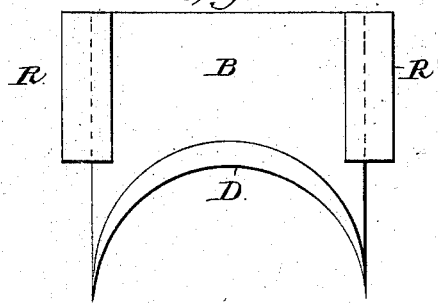
Witnesses:
H. B. Crossett,
C. W. Hodges
Inventor:
William H. Wright
by A. S. Cushman
his attorney

UNITED STATES PATENT OFFICE.

WILLIAM H. WRIGHT, OF TARRYTOWN, NEW YORK.

CAR-AXLE PACKING.

SPECIFICATION forming part of Letters Patent No. 296,098, dated April 1, 1884.

Application filed August 16, 1883. (No model.)

*To all whom it may concern:*

Be it known that I, WILLIAM H. WRIGHT, a citizen of the United States of America, residing at Tarrytown, county of Westchester, in the State of New York, have invented a new and useful Improvement in Shaft-Packing for Car-Axles, of which the following is a full, clear, and exact description, reference being had to the accompanying drawings, in which similar letters refer to similar parts throughout the several views.

Great difficulty is experienced in preventing the escape and consequent waste of oil or other lubricants through the openings in the boxes under or near the shoulder of the axle; and it is with the object of preventing such waste that I have invented my improved shaft-packing, which is intended to fit closely around such portion of the axle, against the inner wall of the box, and prevent the leakage or swashing of such lubricant through such portion of the box, and also prevent dust, grit, or dirt from entering the box by the same openings and its access to and the injury of the bearings.

The device by which I secure these results consists of a metallic plate provided with a tightening-clip articulating with it and sliding in vertical ways, and both supporting a packing, so as to exhibit to the inner wall of the packer-chamber the uniformly-continuous surface of a compressible and impervious body, preferably felt, attached to or coating it, the continuity of the surface of such body being constantly maintained, so as to admit of no interstices or apertures therein. To insure the constantly steady exhibition of such body at and around the wearing-points of contact with the axle, I employ one or more tension-springs adjusted upon the plate and clip. I prefer an unattached annular spiral or endless spring resting in an unyielding seat located outside a projecting lip or flange extending around the axle-opening upon the back of the plate and clip.

In the accompanying drawings like letters refer to like parts.

Figure 1 shows a back view of the supporting-plate A, with its tightening-clip B, articulating and sliding in ways C C′ by corresponding lugs, R R. D is the projecting lip or flange, which furnishes an unyielding seat for the tension endless spring E. The packing-body is marked n, and the whole is pressed against the inner wall of the packer-chamber by semicircular flat and broad springs, (shown at m,) whose bight only comes in contact with the outer wall.

Fig. 2 is a vertical sectional view of the packing in position in a car-box, X being the journal and X′ the axle, G G the car-box, H the outer wall, K the inner wall, respectively, of the packer-chamber. The annular tension spiral spring E is indicated by circular lines where the section is made. The position of the coat or packing n is shown, and also the binding-springs m.

Fig. 3 shows the plate separated from the clip, which is also separately shown in Fig 4, and both showing space for admitting the car-axle and the articulating and sliding ways and the projecting lips for seating the endless tension-spring E.

The plate and clip should be made of such thickness as to afford an unyielding support to the packing, which should effectually cover the inner wall of the packer-chamber, except at the extreme top and bottom, where a small space is left for adjustment of journal-brasses.

In order that nothing may escape through the intersections of the plate and its clip, the conterminous edges of the packing overlap, so that when compressed they present a continuous surface. The edges of the packing-body are firmly supported around the car-axle by the plate and clip, and complete contact thereat is insured by preventing such supporting-plate and clip from opening or separating by the movements of the axle or by the inevitable friction of the wearing-surfaces, and thus avoiding apertures for the escape of oil. This is accomplished by cutting away the plate to only such width as shall admit the axle and by admitting the clip to articulate with the plate, and especially cutting into crescents the projecting lips of each, so that the ends of the lower crescent shall receive or overlap the ends of the upper crescent, whereby, notwithstanding the wearing of the supporting-plate and clip at points of contact with the axle, no aperture can gradually be created.

The packing is attached to its support by wire sewing or by iron or wooden pegs, or in any other suitable manner which will maintain such packing in contact with its support, and should fully extend to the extreme limits of such support at its edges, but overlapping at conterminous edges, as hereinbefore mentioned.

The binding-springs are preferably flat and broad, attached only at one of their ends to the supporting-plate, while their other ends are free, but resting upon the supporting-plate and presenting the raised curved or bight surface to contact with the outer wall, affording a more uniform, durable, and substantial spring-pressure than that furnished in the springs heretofore used for similar purposes.

The superiority of long uniform tension-spring E over spiral pressure-springs lies in there being no possibility of entanglement, ordinarily termed "buckling," nor of unequal local wear, whereby its efficiency is impaired, while the tension and wear are uniformly distributed throughout the length. My tension-spring admits of applying my packing to both tramway and steam cars, whereas the pressure-springs prevent adaptation to the former and to some of the latter. It also has the advantage of being readily removed or renewed as occasion may require. I am aware that pressure-springs have been used in Patent No. 268,579, granted December 5, 1882, to I. P. Wendell, and also a chain having its ends connected by a short spiral tension-spring to distend the yielding sides of a groove wherein it rests, as in Patent No. 80,465, granted July 28, 1868, to Samuel R. Drummer, and I therefore disclaim such pressure-springs and tension-springs used for distention.

What I claim as my invention, and which I desire to secure by Letters Patent, is—

1. A compressible impervious packing, $n$, such as felt or other similar material, applied, attached, or affixed to the face of a supporting metallic plate, A, and articulating sliding clip B, provided with vertical guides or ways, such packing presenting a continuous impermeable surface in contact with the inner wall, K, of a packer-chamber and around a car-axle shaft in such chamber by means of such supporting-plate and clip, tension-spring E, and pressure-springs $m$, operating substantially in the manner and for the purposes described.

2. In a shaft-packing, the metallic supporting-plate A, its articulating sliding clip B, pressure-springs $m$, and projecting crescent-shaped articulating seat with tension-spring E, substantially operating in the manner and for the purposes described.

WILLIAM H. WRIGHT.

Witnesses:
ELLIS B. SCHNABEL,
WESLEY H. BRONSON.